June 7, 1927.  V. YNGVE  1,631,568

DRY BATTERY

Filed May 3, 1924

Inventor
Victor Yngve
By his Attorney Paul Kolisch

Patented June 7, 1927.

1,631,568

UNITED STATES PATENT OFFICE.

VICTOR YNGVE, OF SOUTH ORANGE, NEW JERSEY, ASSIGNOR, BY MESNE ASSIGNMENTS, TO NATIONAL CARBON COMPANY, INC., OF NEW YORK, N. Y., A CORPORATION OF NEW YORK.

DRY BATTERY.

Application filed May 3, 1924. Serial No. 710,790.

This invention relates to improvements in dry batteries, and particularly in multiple batteries in which individual cells are connected in series.

The present invention is in the nature of an improvement on and modification of the dry battery disclosed in my copending application (Case #11) Serial No. 710,789, filed May 3, 1924, and has for its object the provision of means to facilitate the assembly of dry batteries, the nature of which will more clearly appear from the following detailed description and appended claim.

Figure 1:
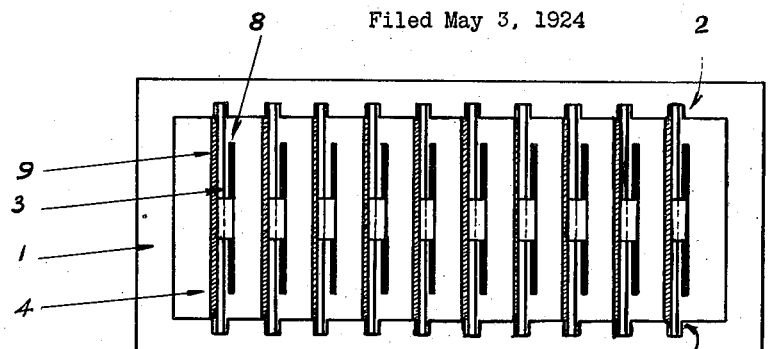
Figure 2:
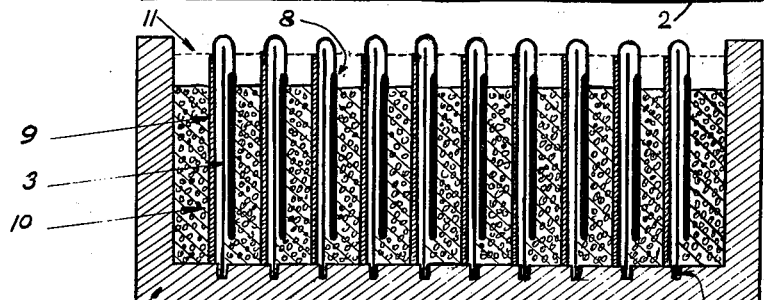
Figure 3:
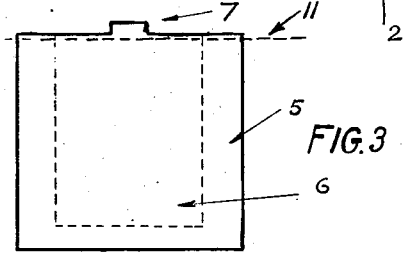
Figure 4:
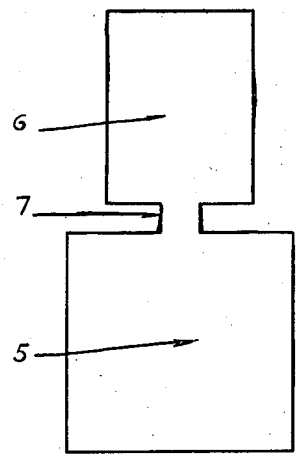

In the drawings, Figs. 1 and 2 are a top plan view and a vertical cross-section, respectively, of a battery assembled in accordance with the present invention; and Figs. 3 and 4 are a side elevation and a top plan view, respectively, of an electrode element.

The battery is assembled in a box 1 of wood, fibre, cardboard, or other suitable insulating material, the two opposite side walls and bottom of which are provided with grooves or saw cuts 2 holding separators 3 of insulating material which divide the box into a plurality of compartments 4. The separators 3 may be of paper coated with paraffin, pitch or the like, the sides and bottom edges of which are sealed into the notches 2 with such insulating compound so as to render the compartments watertight.

The electrodes are formed of zinc in the manner illustrated in Fig. 4, the electrode being stamped in the form of a larger and smaller rectangular disc 5 and 6, interconnected by means of a narrow band 7. The part 6 is covered on both sides with a suitable coating of carbonaceous material or conducting paint 8, such as graphite paint, and serves as a carbon electrode. The electrodes are bent into the shape shown in Fig. 3 and are slipped over the separators 3 with the band 7 bent double, straddling the upper edge of the separator which lies between 5 and 6. A layer of porous absorbent material, e. g., in the form of a sheet of paper 9 coated with paste, is placed now against each exposed electrode surface 5, entirely covering them. Rectangular tablets 10 compacted of a suitable depolarizing mixture are inserted now into each compartment 4. The tablets are molded or compacted in the manner disclosed in a copending application of W. F. Hendry, Serial No. 654,611, filed July 30, 1923.

When the battery is soaked the tablets 10 and the paste will expand and press the discs 5 and 6 tightly against the separators 3. The battery is then sealed by means of the usual sand and pitch seals up to the line 11 (see Figs. 2 and 3). The protruding ends of the zincs are coated with paraffin or the like to prevent accidental short-circuits. The connecting bands 7, which project from the cell in the form of lugs, may be used as binding posts through which connections may be established with various cells of the battery. These binding posts serve as terminals for the zinc electrode of one, and the carbon electrode of the adjacent battery.

Obviously, numerous modifications are practicable in the application of the present invention to battery structures without departing from the spirit thereof.

What I claim is:

In a dry battery, a box of insulating material, separators of insulating material dividing said box into a plurality of watertight compartments, zinc electrodes shaped into two rectangular plates of unequal size joined by a narrow band mounted in said box with the two plates enclosing a separator and the narrow bands straddling the upper edge of the separator, said narrow bands being used as connection terminals, a coating of conducting paint covering the smaller one of the plates, a layer of porous absorbent material covering the free side of the other plate, and a rectangular tablet compacted of depolarizing mixture in each compartment.

In testimony whereof, I have signed my name to this specification.

VICTOR YNGVE.